(12) United States Patent
Kamerbeek et al.

(10) Patent No.: US 8,906,435 B2
(45) Date of Patent: Dec. 9, 2014

(54) SYSTEM, METHOD AND CAPSULE FOR PREPARING A BEVERAGE

(75) Inventors: Ralf Kamerbeek, De Meern (NL); John Henri Flamand, Lunteren (NL); Angenita Dorothea Post van Loon, Utrecht (NL); Hendrik Cornelis Koeling, Amersfoort (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/327,010

(22) Filed: Dec. 15, 2011

(65) Prior Publication Data
US 2012/0263830 A1 Oct. 18, 2012

Related U.S. Application Data

(63) Continuation of application No. PCT/NL2009/050832, filed on Dec. 30, 2009.

(30) Foreign Application Priority Data

| Jun. 17, 2009 | (EP) | 09162917 |
| Jun. 17, 2009 | (EP) | 09162927 |
| Jun. 17, 2009 | (EP) | 09162941 |
| Jun. 17, 2009 | (EP) | 09162984 |

(51) Int. Cl.
| *B65B 29/02* | (2006.01) |
| *A23L 1/20* | (2006.01) |
| *A23L 1/28* | (2006.01) |
| *A23F 5/00* | (2006.01) |
| *A47J 31/06* | (2006.01) |
| *A47J 31/36* | (2006.01) |
| *B65D 85/804* | (2006.01) |

(52) U.S. Cl.
CPC ........... *A47J 31/368* (2013.01); *B65D 85/8043* (2013.01); *A47J 31/0673* (2013.01)
USPC ............ 426/77; 426/431; 426/432; 426/433; 99/295

(58) Field of Classification Search
USPC ......................... 426/77–79, 431–433; 99/295
See application file for complete search history.

(56) References Cited

U.S. PATENT DOCUMENTS

| 3,615,708 A | 10/1971 | Abile-Gal |
| 4,321,139 A | 3/1982 | Auclair |

(Continued)

FOREIGN PATENT DOCUMENTS

| EP | 0 512 148 | 11/1992 |
| EP | 1 555 219 | 7/2005 |

OTHER PUBLICATIONS

International Search Report for PCT Application No. PCT/NL2009/050832, completed Feb. 10, 2010, 3 pages.

*Primary Examiner* — Drew Becker
*Assistant Examiner* — Luana Z Long
(74) *Attorney, Agent, or Firm* — Foley & Lardner LLP

(57) ABSTRACT

A system for preparing a beverage includes an exchangeable capsule, an apparatus including a receptacle for holding the exchangeable capsule, and a fluid dispensing device for supplying a fluid to the exchangeable capsule. The exchangeable capsule includes a circumferential wall, a bottom, and a lid. The wall, bottom and lid enclose an inner space including the extractable product. The receptacle includes bottom piercing means for piercing an entrance area of an alternative capsule for creating an entrance opening for supplying the fluid to the extractable product. The entrance area of the capsule includes an entrance filter for supplying the fluid to the extractable product therethrough. The filter is a multi-layer filter including at least a first layer and a second layer bonded together. The first layer has a higher tear strength than the second layer and the second layer has a higher stiffness than the first layer.

23 Claims, 3 Drawing Sheets

(56) References Cited

U.S. PATENT DOCUMENTS

| | | |
|---|---|---|
| 4,417,504 A | 11/1983 | Yamamoto |
| 4,859,337 A * | 8/1989 | Woltermann .................. 210/474 |
| 5,325,765 A | 7/1994 | Sylvan et al. |
| 5,840,189 A | 11/1998 | Sylvan et al. |
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| 6,810,788 B2 * | 11/2004 | Hale ............................. 99/295 |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 2003/0172813 A1 * | 9/2003 | Schifferle ...................... 99/275 |
| 2004/0045443 A1 | 3/2004 | Lazaris et al. |
| 2004/0115310 A1 * | 6/2004 | Yoakim et al. .................. 426/77 |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2010/0024658 A1 | 2/2010 | Jacobs et al. |
| 2010/0303964 A1 | 12/2010 | Beaulieu et al. |

* cited by examiner

SYSTEM, METHOD AND CAPSULE FOR PREPARING A BEVERAGE

CROSS-REFERENCE TO RELATED PATENT APPLICATIONS

This application is a continuation of International Patent Application No. PCT/NL2009/050832, filed Dec. 30, 2009, which claims priority to European Patent Application Nos. 09162917.0, filed Jun. 17, 2009; 09162941.0, filed Jun. 17, 2009; 09162927.9, filed Jun. 17, 2009; and 09162984.0, filed Jun. 17, 2009. All of these applications are incorporated herein by reference.

BACKGROUND

The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom and a lid enclosing an inner space comprising the extractable product, wherein the bottom comprises an entrance area and the system is arranged for bringing the fluid dispensing device in fluid connection with the entrance area for supplying the fluid to the extractable product for preparing the beverage, and wherein the lid comprises an exit area and the system comprises an outlet which, in use, is in fluid communication with the exit area for draining the prepared beverage from the capsule and supplying the beverage to a container such as a cup.

Such a system using a capsule enclosing an inner space comprising the extractable product is known per se. The exit area of the lid may be provided with a filter sheet or other perforate and/or porous filter. The capsule may for example comprise roasted and ground coffee as extractable product. The capsule may be used for preparing a predetermined quantity of coffee in a suitable apparatus. A drawback of such a capsule may be that the reproducibility of the prepared beverage may be poor. Due to for example poor stability, deformation, rupture, tearing and/or widening of e.g. openings of the filter under influence of e.g. fluid pressure in the capsule, the quality of the prepared beverage may be poor and/or the quality of the prepared beverage may not be reproducible and/or may vary from capsule to capsule.

SUMMARY

It is an object of the invention to improve the above system, and more specifically to improve the reproducibility of the quality of the prepared beverage.

Thereto, according to the invention, a system is provided for preparing a predetermined quantity of beverage suitable for consumption using an extractable product, comprising an exchangeable capsule, and an apparatus comprising a fluid dispensing device for supplying an amount of a fluid, such as water, under pressure to the exchangeable capsule, and a receptacle for holding the exchangeable capsule, wherein the exchangeable capsule comprises a circumferential wall, a bottom, and a lid enclosing an inner space comprising the extractable product, wherein the fluid dispensing device is arranged for supplying the fluid to the extractable product through the bottom for forming the beverage, wherein the bottom comprises an entrance area and the system is arranged for bringing the fluid dispensing device in fluid connection with the entrance area for supplying the fluid to the extractable product for preparing the beverage, wherein the lid comprises an exit area and the system comprises an outlet which, in use, is in fluid communication with the exit area for draining the prepared beverage from the capsule and supplying the beverage to a container such as a cup, wherein the receptacle is arranged for draining the prepared beverage from the capsule through the exit area, wherein the exit area of the capsule comprises a sheet-shaped multi-layer filter comprising at least a first layer and a second layer bonded together, wherein the first layer has a higher tear strength than the second layer and wherein the second layer has a higher stiffness than the first layer.

By providing a multi-layer filter of which a first layer has a higher tear strength than a second layer and the second layer has a higher stiffness than the first layer and wherein the first and second layers are bonded together, rupture of the filter may be avoided under influence of e.g. fluid pressure. The filter may comprise perforate and/or porous layers.

For example, if the filter comprises layers with openings, the first layer may prevent the openings from tearing and the second layer may prevent the openings from widening under the influence of fluid pressure. For example, if the filter comprises porous layers, the first layer may prevent rupture of the filter, the second layer may minimize deformation of the filter. By bonding the layers together, the layers may strengthen each other and may thus provide a multi-layer filter of which deformation and/or rupture may be minimized. Bonding the layers together may be done by a chemical or a physical bond. For example, the layers may be glued together, or they may be heat-pressed to each other. Preferably, the layers are bonded together over approximately the entire surface. For producing the filter, the layers may be bonded together, for example, the layers may be sealed together. Then a non-porous layer may be perforated for example, with a hot or cold needle or with a laser. Other ways of forming openings may also be possible, e.g. removing material chemically or mechanically, such as cutting. Also, it may be possible to provide an 'open' layer and the openings may be formed by closing chemically or mechanically, e.g. gluing, sealing, painting etc. the areas around the determined openings.

The tear strength is a property of the material used for the layer and as such defined by the manufacturer of the material. The tear strength relevant for the invention is the tear strength of the material when a layer of the material is loaded in the plane of the layer.

The stiffness is a property of the material used for the layer and as such defined by the manufacturer of the material. The stiffness relevant for the invention is the stiffness of the material when a layer of the material is loaded transverse to the plane of the layer.

The tear strength of the first layer is thus significantly higher than the tear strength of the second layer and may therefore prevent rupture of the openings of the filter. The stiffness of the second layer is thus significantly higher than the stiffness of the first layer and may therefore minimize deformation of the openings of the filter.

Deformation and/or rupture of the filter may lead to inferior quality of the prepared beverage. By avoiding deformation and/or rupture of the filter, the quality of the prepared beverage may be approximately more constant from capsule to capsule. Beverage prepared with a capsule according to the invention may have an improved quality and may be more reproducible from one capsule to another.

For example, there are state of the art closed filters that are intended to be torn open during preparation of the beverage.

This tearing process however is uncontrolled and the beverage is not reproducible from one capsule to another because the tearing of the openings is not well reproducible from one capsule to another. Also, grains and/or other sediments of the extractable product may come into the prepared beverage through the torn openings, which may reduce the quality of the prepared beverage. By providing a multi-layer filter of which a first layer has a higher tear strength and the second layer has a higher stiffness, the filter layer may be designed to minimize rupture and/or deformation and to optimize reproducibility and controllability of the preparation of the beverage.

Preferably, the first layer has a tear strength that is at least 20%, preferably 50% higher than the tear strength of the second layer. Preferably, the second layer has a stiffness that is at least 20%, preferably 50% higher than the stiffness of the first layer to provide a sufficiently stiff and strong filter.

In an embodiment, the multi-layer filter may comprise more than two layers of which following layers have a higher tear strength and a higher stiffness respectively. The multi-layer filter may act as a more stable flow resistance for the fluid under pressure in the capsule.

By providing the multi-layer filter with a first and a second layer bonded together, wherein the first layer has a higher tear strength than the second layer and the second layer has a higher stiffness than the first layer, a reproducible fluid pressure may be built up in the capsule comprising a lid with such a multi-layer filter. By providing a sufficiently strong and sufficiently stiff multi-layer filter, sufficient pressure may be developed in the capsule in a controlled and/or predetermined way, thus providing a better quality extracted beverage. The layers can be perforate and/or porous, the dimensions of the perforations and/or the pores may remain approximately the same under influence of the pressure in the capsule. Preferably, the dimensions may deviate less than 3% during use of the capsule under influence of the pressure in the capsule. The perforations and/or the pores may not tear and any variation of the openings is predetermined and controlled. Contrary to tearing of a filter layer, which is uncontrolled and unpredictable, the behavior of the openings of the multi-layer filter can be controlled and predetermined.

In an embodiment, the openings in the multi-layer filter may be formed by a laser. Due to the heat of the laser, on a peripheral edge of an opening a melting ridge may be provided. In the melting ridge, more material is present, resulting in a locally reinforced area. This melting ridge may also contribute to the resistance of the first layer against tearing and/or to the stiffness of the second layer. For the creation of the melting ridge it is unimportant from which side the laser focuses on the filter, because due to the different mechanical properties of the layers in the filter, the melting ridge will be created on the same side.

Also, the thickness of the layers may be relatively limited. For example, the thickness of a layer may be between approximately 5 μm and approximately 40 μm. Preferably, the thickness of the layers is between approximately 10 μm and approximately 35 μm. For example, the thickness of the first layer can be approximately 12 μm or approximately 23 μm, the thickness of the second layer can be approximately 30 μm. In an embodiment, the first layer having the higher tear strength may be provided from chlorinated polypropylene (CPP) and may be approximately 30 μm thick. The second layer having the higher stiffness may be provided from polyethylene therephthalate (PET) and may be approximately 15 μm thick.

In an embodiment, the first layer may be provided at the inside of the capsule, i.e. directed towards the inner space with the extractable product. The grains of the extractable product may then cooperate with the material of the first layer by slightly pressing in the material, in particular near the openings. Thus the grain particles may cooperate to bridge the opening and thus may help to provide the flow resistance.

Preferably, the pores and/or perforations of the multi-layer filter are smaller than the grain size of the extractable product such that the extractable product remains in the capsule. The flow restriction may be formed by the multi-layer filter itself and/or by the multi-layer filter in combination with the grains of the extractable product, e.g. when grains partly obstruct pores and/or perforations of the filter. The openings can be between approximately 0.2 mm and approximately 0.4 mm. The number of openings and/or the size of the openings may be determined depending on the grind of the coffee or extractable product. The grind of the coffee in combination with the distribution and/or number and/or size of the openings is an aspect determining the quality of the prepared coffee. Preferably, this combination between grind and distribution and/or number and/or size of the filter openings results in coffee with a more constant quality and/or more cream and/or more reproducibility and/or more resemblance to the classic brewed espresso and/or a higher number of dry matter in the prepared coffee.

By providing a capsule of which the first layer is of a first material and the second layer is of a second material which layers may be bonded together, a relative cost effective multi-layer filter may be obtained of which deformation and/or rupture may be avoided under influence of e.g. fluid pressure in the capsule. For example, the first layer may comprise polypropylene or the second layer may comprise polyethylene or vice versa. Also polyamide or any other material, such as e.g. nylon, polyethylene therephthalate (PET), chlorinated polypropylene (CPP), ethylene vinyl alcohol (EVOH), ethylene vinyl acetate (EVA), linear low density poly ethylene (L-LDPE), polypropylene (PP), low density poly ethylene (LDPE), with appropriate characteristics may be used. Off course, many other materials may be used. Also, a first layer may be filter paper and the second layer may be a perforate foil or both layers may be perforate foils with openings that correspond to each other.

Further, the entrance area may be formed as a filter as well. By providing the bottom with a multi-layer filter comprising at least two layers bonded together of which a first layer has a higher tear strength than a second layer and the second layer has a higher stiffness than the first layer, a bottom filter may be obtained that may be less susceptible to tear and/or rupture and/or deformation. Also, the entrance filter may be a multi-layer filter and the exit filter may be a single layer filter or vice versa.

By providing a capsule of which the lid and the bottom comprise such a multi-layer filter a reproducible and/or controllable fluid pressure may be developed in the capsule, thus providing a reproducible quality of prepared beverage.

In an embodiment, the receptacle of the apparatus of the system may comprise a support surface against which the lid of the capsule may abut. The support surface may comprise a non-flat geometry of for example ribs and/or grooves. For a capsule with a lid comprising a multi-layer filter according to the invention, the filter may in the case of a non-flat geometry be sufficiently flexible and/or elastic to follow the geometry of the support surface without tearing and/or rupture, or, if the filter comprises perforations, without substantially widening of the perforations. In an embodiment, the filter only follows the tops of the non-flat geometry and may not deform until into the bottoms of the non-flat geometry. For example, if the non-flat geometry comprises regularly arranged blunt tops and bottoms in between, the filter may only contact the top surfaces during preparation of the beverage under influence of the pressure in the capsule. The filter may be sufficiently stiff not to deform until the bottom of the non-flat geometry.

In an embodiment, the fluid may be provided to the capsule by either piercing a closed bottom of the capsule, or by providing the bottom of the capsule with a sheet-shaped filter layer through which the fluid may enter the capsule. The sheet-shaped multi-layer filter may then be sufficiently stiff and strong as not to be pierced by the piercing means. Also when an apparatus for preparing the beverage comprises bottom piercing means, the bottom of the capsule may be arranged at such a distance of the lid of the capsule that the bottom piercing means cannot pierce the bottom when in use.

In an embodiment, the entrance area of the bottom may be provided with a multi-layer filter for entering the fluid under pressure in the capsule. By providing the layers of the filter sufficiently strong and/or sufficiently stiff, such that the multi-layer filter may not be pierced by the bottom piercing means, the entrance filter may, in use, stay intact. Thus a stable entrance area may be provided and a reliable and reproducible pressure developed may be obtained in the capsule.

The invention also relates to a capsule with a multi-layer filter for use in such a system.

The invention also relates to the use of a capsule for preparing a predetermined quantity of beverage in an apparatus of such a system.

The invention further relates to a method for preparing a predetermined quantity of beverage suitable for consumption using an extractable product, comprising providing an exchangeable capsule, comprising a circumferential wall, a bottom, and a lid enclosing an inner space comprising the extractable product, providing an apparatus comprising a receptacle for holding the exchangeable capsule, a fluid dispensing device for supplying an amount of a fluid, such as water, under pressure to the exchangeable capsule for preparing the beverage, and an outlet which, in use, is in fluid communication with the capsule for draining the prepared beverage from the capsule and supplying the beverage to a container such as a cup, supplying the fluid to the extractable product for preparing the beverage, wherein the lid of the capsule is a sheet-shaped multi-layer filter comprising at least a first layer and a second layer bonded together, wherein the first layer has a higher tear strength than the second layer and wherein the second layer has a higher stiffness than the first layer.

BRIEF DESCRIPTION OF THE DRAWINGS

The invention will now be further elucidated by means of non-limiting examples referring to a drawing in which.

In this description, identical or corresponding items have identical or corresponding reference numerals. The exemplary embodiments shown should not be construed to be limitative in any manner and serve merely as illustration.

DETAILED DESCRIPTION OF EXEMPLARY EMBODIMENTS

Figure 1:
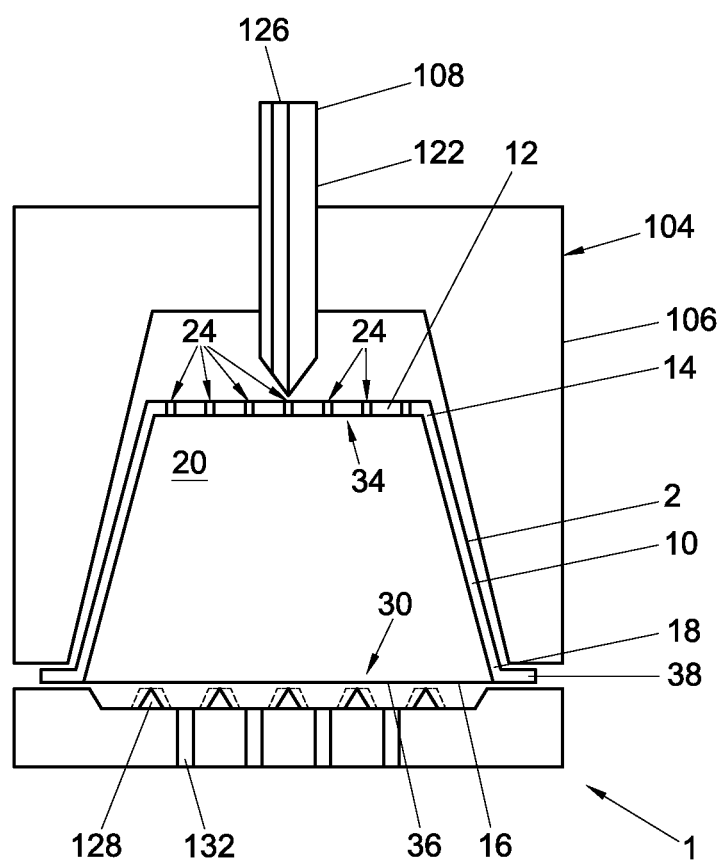
FIG. 1 shows an embodiment of the system according to the invention.

FIG. 1 shows an example of an embodiment of a system 1 according to the invention for preparing a predetermined quantity of beverage suitable for consumption using an extractable product. The system 1 comprises an exchangeable capsule 2, and an apparatus 104. The apparatus 104 comprises a receptacle 106 for holding the exchangeable capsule 2. In this example, the receptacle 106 has a shape complementary to the shape of the capsule 2. In FIG. 1 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, such as water, under pressure to the exchangeable capsule 2.

In the system 1 shown in FIG. 1, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack. The extractable product may e.g. be roasted and ground coffee.

The system 1 of FIG. 1 comprises bottom piercing means 122 intended for piercing an alternative capsule. FIG. 1 shows the bottom piercing means in an extended position, intended for creating an entrance opening in the bottom of an alternative capsule. According to the invention, the capsule 2 comprises an entrance filter 34 which is positioned at a distance from the bottom piercing means 12, such that the capsule 2 is not pierced by the bottom piercing means 122 and the bottom 12 stays intact when the bottom piercing means is brought in the extended position.

In FIG. 1 the piercing means 122 comprise a bore 126 through which the fluid is supplied to an inner space of the receptacle 106. The fluid, here hot water under a pressure built up to and above e.g. 6 bars, will flow through the entrance filter 34 into the inner space 20 of the capsule 2 for extracting desired substances from the extractable product, in this example approximately 4-8 grams of roasted and ground coffee, for preparing, in this example the single cup of the beverage, here coffee. The fluid may be supplied with a pressure between 4 and 20 bars, preferably between 5 and 18 bars and more preferably between 6 and 15 bars, for example 12 bars. Depending on the compaction, grain size and/or desired character of the beverage, between 4 and 10 grams of extractable product may be contained in the capsule 2.

Thus, more in general, in the example of FIG. 1, the bottom 12 comprises an entrance area, formed by the entrance filter 34, and the system 1 is arranged for bringing the fluid dispensing device 108 in fluid connection with the entrance area for supplying the fluid to the extractable product for preparing the beverage.

In the example of FIG. 1, the circumferential wall 10 is substantially rigid. The circumferential wall may e.g. comprise a plastics material and may be formed by e.g. injection moulding, vacuum-forming, thermoforming or the like, or may comprise a metal material. Also, in the example of FIG. 1, the circumferential wall 10 is frusto-conical, but other shapes are also possible. For example, the circumferential wall may be cylindrical or pyramidal.

In the example of FIG. 1 the bottom 12 is integral with the circumferential wall 10. In this example the entrance filter 34 is formed by a plurality of entrance openings 24 in the bottom 12. In this example the plurality of entrance openings 24 is distributed over substantially the entire bottom 12. Thus, the fluid is supplied to the extractable product via the plurality of entrance openings 24, which causes the extractable product to be wetted over substantially the entire cross section of the capsule 2. Hence, a very homogeneous supply of fluid to the extractable product is obtained. Also, patterns of openings and/or areas with openings in conjunction with areas without openings may also be provided, for example the openings may be arranged in the central area of the filter, a peripheral area of the filter may be kept without openings.

According to an aspect of the invention, the system 1 of FIG. 1 comprises lid piercing means 128 intended for piercing the lid of an alternative prior art capsule when the lid sufficiently presses against the lid piercing means 128 under the influence of the pressure of the fluid and/or beverage in the prior art capsule for creating at least one exit opening through which the beverage can drain from the prior art capsule.

According to the invention, the capsule 2 comprises an exit filter 36, through which the beverage can drain from the capsule 2. According to the invention, the exit filter 36 is a multi-layer exit filter comprising at least a first layer and a second layer bonded together. The first layer has a higher tear strength than the second layer and the second layer has a higher stiffness than the first layer, preferably the first layer has a significantly higher tear strength than the second layer and the second layer has a significantly higher stiffness than the first layer. The exit filter 36 is thus sufficiently strong and sufficiently stiff not to be pierced by the lid piercing means 128 under the influence of the pressure inside the capsule 2. Under influence of the pressure inside the capsule 2, the exit filter 36 may stay intact under influence of the pressure, it may not tear, rupture or be pierced by the lid piercing means. Sufficient pressure may be built up in the capsule 2 for a good quality beverage. Moreover, due to the sufficient strong and sufficient stiff exit filter, the pressure built up may be reproducible and/or controllable from one capsule to another, thereby improving the reproducibility and/or quality of the brewed beverage.

Alternatively, or additionally, the exit filter 36 forms a sufficient flow resistance for the beverage exiting the capsule 2, that the exit filter 36 is not pressed against the lid piercing means 128 with sufficient force to be pierced by the lid piercing means 128 and the lid 16 stays intact. The exit filter 36 may be pressed against the lid piercing means, but will not tear or rupture. The exit filter 36 is sufficiently stiff and strong that it may follow only the top surfaces of the lid piercing means without deforming until the bottom in between the tops is reached. Any deformation of the exit filter 36 is thus relatively limited. Hence, the exit filter 36 is adapted to the lid piercing means 128 such that the capsule 2, in use, is not pierced by the lid piercing means 128 and the lid 16 stays intact. More in general it applies that the exit filter 36 and the lid piercing means 128 are adapted to each other such that the capsule 2, in use, is not pierced by the lid piercing means 128 and the lid 16 stays intact.

In the example of FIG. 1, the lid piercing means 128 are shown having sharp toothed points intended for piercing the lid. It will be appreciated that, alternatively, the lid piercing means 128 may have blunt piercing surfaces, e.g. as indicated with dashed lines in FIG. 1. In such embodiment, an alternative capsule may, nevertheless, be pierced by the blunt piercing means 128, e.g. when the lid of the prior art capsule consists of a sheet of aluminium foil. Parameters of the exit filter 36 of the capsule 2 of the system 1 according to the invention can be chosen such that the exit filter 36 has the sufficiently high tear strength and/or forms the sufficiently low flow resistance not to be pierced or torn. It will be appreciated that when the lid piercing means 128 are blunt, the parameters of the exit filter 36 may be chosen to suit these blunt piercing means 128. When the piercing means 128 are blunt, the exit filter 36 may e.g. be thinner than when the lid piercing means are sharp, while guaranteeing that the exit filter 36 has the sufficiently high tear strength and/or sufficient stiffness and/or forming the sufficiently low flow resistance not to be pierced and/or torn and/or ruptured.

It is possible that the lid piercing means 128 comprise ridges against which the lid, in use, abuts. Such ridges may be formed by the blunt piercing means 128 as shown with dashed lines in FIG. 1. The ridges may e.g. form at least 10%, possibly at least 25% of the portion of the surface of the receptacle 106 which, in use, coincides with the portion of the surface area of the lid 16 overlying the second, open, end 18. Hence, in use, the lid 16 may be supported by the ridges over, e.g. at least 10%, preferably at least 25%, of the portion the surface area of the lid 16 overlying the second, open, end 18. As already indicated, the lid of an alternative prior art capsule may be pierced by such ridges, whereas parameters of the exit filter 36 of the capsule 2 of the system 1 according to the invention may easily be chosen such that the exit filter has the sufficiently high tear strength and/or forms the sufficiently low flow resistance not to be pierced or torn. It will be appreciated that when the lid piercing means comprise ridges, the parameters of the exit filter 36 may be chosen to suit such lid piercing means.

In the example of FIG. 1, the ridges comprise edges which are not sharp. In this example a radius of curvature of the edges is approximately 50 μm, although other radii are conceivable, such as 100, 200 or 500 μm. The prior art capsule may, nevertheless, be pierced by the blunt piercing means 128, e.g. when the lid of the prior art capsule consists of a sheet of aluminium foil. It will be appreciated that when the lid piercing means comprise non-sharp edges, the parameters of the exit filter 36 may be chosen to suit such lid piercing means. Parameters of layers of the exit filter 36 of the capsule 2 of the system according to the invention can be chosen such that the exit filter 36 has the sufficiently high tear strength and/or forming the sufficiently low flow resistance not to be pierced or torn.

It is also possible that the ridges of the lid piercing means 128 have a convex top against which the lid 16 abuts. Hence, when the lid, in use, is pressed against the ridges, the surface area over which the lid is supported by the ridges increases, thus reducing the local pressure exerted on the lid by the ridges. Thus it is possible to provide, in an easy manner, that the lid, in use, does not tear and/or rupture and stays intact.

Figure 2:
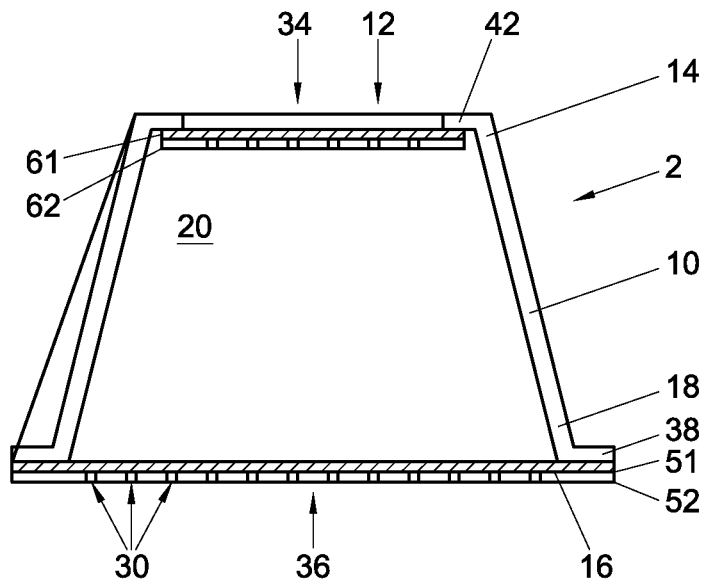
FIG. 2 shows a first embodiment of a capsule according to the invention.
Figure 3:
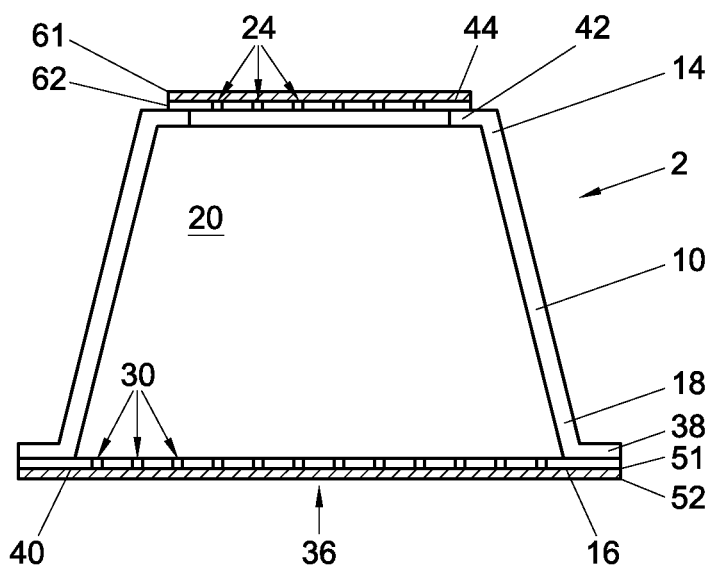
FIG. 3 shows a second embodiment of a capsule according to the invention.

In the example of FIG. 1 the exit filter 36, forming an exit area of the capsule 2, through which the beverage, here coffee, can drain from the capsule, is formed by a porous sheet, such as filter paper comprising two layers bonded to each other, as shown e.g. in FIG. 2 and FIG. 3. In this example the entire lid 16 is formed as the exit filter 36. In the examples of FIG. 1, FIG. 2, FIG. 3 and FIG. 4, the capsule 2 comprises an outwardly extending rim 38 at the second end 18, wherein the lid 16 is attached to the outwardly extending rim 38, e.g. by gluing, welding or the like. Hence, in this example the exit filter 36, i.e. the multi-layer sheet, is attached to the outwardly extending rim 38.

In this example the exit filter 36 forms a substantially continuous fluid-permeable multi-layer sheet spanning substantially the entire second, open end 18 of the capsule 2. Thus, the fluid can drain from the capsule 2 over a large area. Hence, a very homogeneous drain of beverage from the extractable product is obtained.

In general, parameters of the layers of the exit filter of the capsule 2 of the system 1 according to the invention can be chosen such that the exit filter does not tear or rupture, e.g. having the sufficiently high tear strength and/or having sufficiently high stiffness and/or forming the sufficiently low flow resistance not to be pierced or torn. When the exit filter 36 is e.g. made of layers of filtering paper, parameters of the filtering paper, such as density, thickness and/or PE-content, can easily be chosen to provide the exit filter having the sufficiently high tear strength and/or sufficiently high stiffness and/or forming the sufficiently low flow resistance. Alternatively, when the layers of the exit filter 36 are e.g. formed by a polymeric film provided with a plurality of exit openings, parameters of the polymeric foil, such as density, thickness, number of exit openings, size and/or shape of exit openings, can easily be chosen to provide the third wall having the sufficiently high tear strength and/or forming the sufficiently low flow resistance.

Different materials may be used for the different layers. Many materials may be suitable, for example, PE, PP, PET, nylon, EVOH, EVA, L-LDPE, LDPE, metal. Also, the layers may have a different thickness. For example, the thickness of a layer may be between approximately 5 µm and approximately 40 µm. Preferably, the thickness of the layers is between approximately 10 µm and approximately 35 µm. For example, the thickness of the first layer can be approximately 12 µm or approximately 23 µm, the thickness of the second layer can be approximately 30 µm.

Figure 4:
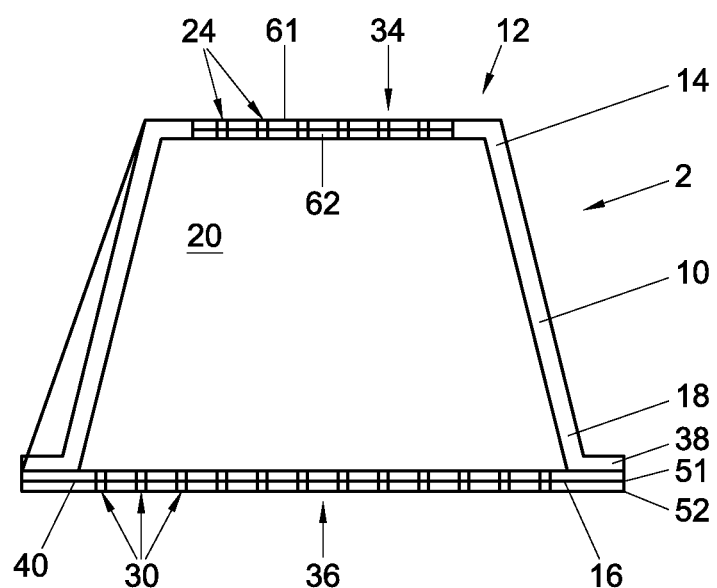
FIG. 4 shows a third embodiment of a capsule according to the invention

FIG. 2 shows an embodiment of a capsule 2 according to the invention. The exit filter 36 comprises two layers 51, 52. The two layers 51, 52 are bonded together so they can act on each other and/or strengthen each other. A physical and/or a chemical bond may be provided over approximately entire surface of the layers. According to the invention, a first layer 51 has a higher tear strength than a second layer 52, and the second layer 52 has a higher stiffness than the first layer 51. The stiffness and the tear strength of the layers 51, 52 is such that the layers will not tear, rupture or deform too much such that the exit filter 36 may have a relatively constant flow resistance for a pressure built up in the capsule, which may thus become more reproducible and/or more controllable. In FIG. 2 is shown that the exit filter 36 comprises a porous layer 51 and a perforate layer 52 with openings 30. FIG. 3 shows an embodiment of a capsule of which the exit filter 36 has a perforate layer 51 and a porous layer 52. The porous layer may be sufficiently strong to prevent widening of the openings 30 of the perforate layer, and the perforate layer may be sufficiently stiff to prevent tearing of the porous layer. Also, as can be seen in FIG. 4, two perforate layers may be provided or two porous layers may be provided. The perforations 30 of the layers 51 and 52 of the exit filter 36 correspond with each other, as to provide fluid passages for discharging the fluid from the capsule 2. Also a multi-layer filter may be provided comprising more than two layers. For example a multi-layer filter comprising three or more layers may be provided, each of a different tear strength and/or stiffness. By providing different layers of each different characteristic, the layers may strengthen each others characteristics thus providing a multi-layer filter that may not tear, rupture or being pierced. Preferably, for a perforate layer the perforations may not deform under influence of pressure. Preferably, the dimensions of the perforations may vary less than 3% during use of the capsule during preparation of the beverage. Also, for a porous layer, preferably the pores may not deform and the dimensions of the pores may not vary more than 3% during use of the capsule during preparation of the beverage.

The exit filter 36 may be provided upstream or downstream of the lid 16, or may be provided in the exit opening of the lid 16. Preferably the exit filter 36 is attached to the outwardly extending rim 38. The exit filter 36 may also be attached to the circumferential wall 14.

In general, the exit openings 30, perforations of a perforate layer or pores of a porous layer, are dimensioned such that a dimension of the opening 30 is sufficiently small to retain most of the larger particles of the extractable product, such as ground coffee, inside the capsule 2. Only very small particles, so-called fines, may exit via the openings. Also, in general, the exit openings 30 are dimensioned and distributed such that a sufficient flow resistance may be obtained in order to allow a certain pressure built up in the capsule before the extracted beverage drains from the capsule.

According to an aspect of the invention, the bottom 12 is provided with an entrance filter 34. The entrance filter 34 may be provided as a multi-layer filter comprising for example two layers 61, 62, as shown in FIG. 2 and FIG. 3. Also, an entrance filter comprising more than two layers may be provided. Alternatively, a capsule 2 may also be provided without entrance filter 34, leaving the entrance area open. The entrance filter 34 may be provided upstream or downstream of the bottom 12, or—not shown—may be provided in the entrance opening, attached to an inwardly extending rim 42. Since the rim thickness is not present in the inner space 20 of the capsule 2, the internal volume may thus be maximised. The entrance filter may alternatively or additionally be attached to the circumferential wall 10.

A first layer 61 of the entrance filter 34 may be a porous sheet, e.g. filter paper, and a second layer 62 may be a perforate sheet, e.g. polymeric foil, as shown in FIG. 2 and FIG. 3. According to an aspect of the invention, the first layer has a higher tear strength and the second layer has a higher stiffness. Alternatively, the first layer may be a perforate foil and the second layer may be a porous sheet. Entrance openings 24 may be distributed approximately evenly over the entrance area as to allow a homogeneous supply of the fluid to the extractable product. As shown in FIG. 4, both layers 61 and 62 of the multi-layer entrance filter 34 may be perforate layers. The perforations 24 in both layers correspond with each other as to provide fluid passages.

It shall be obvious that the invention is not limited in any way to the embodiments that are represented in the description and the drawings. Many variations and combinations are possible within the framework of the invention as outlined by the claims. For example, the embodiments described show the first layer upstream of the second layer. It may be clear to the person skilled in the art that the second layer may also be upstream of the first layer. Also, in the embodiments described, the first layer may be thinner than the second layer. It may be clear to the person skilled in the art that the second layer may also be thinner than the first layer. Combinations of one or more aspects of the embodiments or combinations of different embodiments are possible within the framework of the invention. All comparable variations are understood to fall within the framework of the invention as outlined by the claims.

What is claimed is:

1. A system for preparing a predetermined quantity of beverage suitable for consumption using an extractable product, comprising:
   an exchangeable capsule, and
   an apparatus comprising a fluid dispensing device for supplying an amount of a fluid, such as water, under pressure to the exchangeable capsule, and a receptacle for holding the exchangeable capsule, wherein the exchangeable capsule comprises
a circumferential wall, a bottom, and a lid enclosing an inner space comprising the extractable product,
wherein the fluid dispensing device is arranged for supplying the fluid to the extractable product through the bottom for forming the beverage,
wherein the bottom comprises an entrance area and the system is arranged for bringing the fluid dispensing device in fluid connection with the entrance area for supplying the fluid to the extractable product for preparing the beverage,
wherein the lid comprises an exit area and the system comprises an outlet which, in use, is in fluid communication with the exit area for draining the prepared beverage from the capsule and supplying the beverage to a container such as a cup,
wherein the receptacle is arranged for draining the prepared beverage from the capsule through the exit area,
wherein the exit area of the capsule comprises a sheet-shaped multi-layer filter comprising at least a first layer and a second layer bonded together,
wherein the first layer has a higher tear strength than the second layer and wherein the second layer has a higher stiffness than the first layer.

2. The system of claim 1, wherein the first layer has a tear strength that is at least 20% higher than the tear strength of the second layer and wherein the second layer has a stiffness that is at least 20% higher than the stiffness of the first layer.

3. The system of claim 2, wherein the first layer has a tear strength that is at least 50% higher than the tear strength of the second layer and wherein the second layer has a stiffness that is at least 50% higher than the stiffness of the first layer.

4. The system of claim 1, wherein the first layer comprises a first material having a higher tear strength than the second layer and the second layer comprises a second material having a higher stiffness than the first layer.

5. The system of claim 1, wherein the first layer is perforate and/or porous and/or wherein the second layer is perforate and/or porous.

6. The system of claim 5, wherein the first layer and the second layer are perforate wherein the perforations of the first layer correspond with the perforations of the second layer.

7. The system of claim 1, wherein the first and/or the second layer comprises polypropylene and/or polyethylene and/or polyethylene therephthalate and/or chlorinated polypropylene and/or nylon and/or ethylene vinyl alcohol and/or ethylene vinyl acetate and/or low density poly ethylene and/or metal.

8. The system of claim 1, wherein the multi-layer filter is formed by:
a porous sheet, such as filtering paper, and/or
a foil, such as a polymeric film, provided with a plurality of entrance openings.

9. The system of claim 1, wherein the entrance area comprises a sheet-shaped filter.

10. The system of claim 9, wherein the entrance area comprises a multi-layer filter.

11. The system of claim 10, wherein the multi-layer filter comprises a first layer and a second layer, wherein the first layer has a higher tear strength than the second layer and wherein the second layer has a higher stiffness than the first layer, wherein the first and the second layer are bonded together.

12. The system of claim 1, wherein the multi-layer filter comprises at least one layer with openings, wherein the openings are distributed over substantially the entire surface of the filter layer.

13. The system of claim 12, wherein the openings have a diameter of approximately 0.2 mm to approximately 0.4 mm.

14. The system of claim 1, wherein the thickness of the first and/or the second layer is between approximately 5 µm and approximately 40 µm.

15. The system of claim 14, wherein the thickness of the first and/or second layer is between approximately 10 µm and 35 µm.

16. The system of claim 1, wherein the first layer is thinner than the second layer.

17. The system of claim 1, wherein the lid closes the capsule at an outer end.

18. The system of claim 1, wherein the circumferential wall is substantially rigid.

19. The system of claim 1, wherein the receptacle comprises bottom piercing means intended for piercing the bottom of an alternative capsule for creating at least one entrance opening for supplying the fluid to the extractable product through said at least one entrance opening, and
wherein the bottom of the capsule of the system comprises an entrance filter for supplying the fluid to the extractable product there through, which entrance filter is, in use, positioned at a distance from the bottom piercing means, such that the capsule of the system is not pierced by the bottom piercing means and the bottom stays intact.

20. The system of claim 1, wherein the receptacle comprises bottom piercing means intended for piercing the bottom of an alternative capsule for creating at least one entrance opening for supplying the fluid to the extractable product through said at least one entrance opening, and
wherein the bottom of the capsule of the system comprises an entrance filter for supplying the fluid to the extractable product there through, which entrance filter is a multi-layer filter of which the first layer has a sufficient tear strength and the second layer has a sufficient stiffness such that the capsule of the system, in use, is not pierced by the bottom piercing means and the bottom stays intact.

21. The system of claim 1, wherein the receptacle comprises lid piercing means intended for piercing the exit filter of an alternative capsule when the exit area sufficiently presses against the lid piercing means under the influence of the pressure of the fluid and/or beverage in the capsule for creating at least one exit opening through which the beverage can drain from the alternative capsule, and
wherein the exit area of the capsule of the system comprises a multi-layer exit filter, through which the beverage can drain from the capsule of the system, of which the first layer has a sufficient tear strength and the second layer has a sufficient stiffness such that the capsule of the system, in use, is not pierced by the lid piercing means and the lid stays intact.

22. An exchangeable capsule usable with a fluid dispensing device for preparing a predetermined quantity of beverage suitable for consumption, comprising:
a circumferential wall, a bottom, and a lid enclosing an inner space comprising the extractable product,
wherein the bottom comprises an entrance area configured to be in fluid communication with the fluid dispensing device for receiving the fluid from the fluid dispensing such that the extractable product receives the fluid through the bottom for preparing the beverage,
wherein the lid comprises an exit area configured to be in fluid communication with an outlet for draining the prepared beverage from the capsule and supplying the beverage to a container such as a cup, wherein the exit area of the capsule comprises a sheet-shaped multi-layer filter comprising at least a first layer and a second layer bonded together, wherein the first layer has a higher tear strength than the second layer and wherein the second layer has a higher stiffness than the first layer.

23. A method for preparing a predetermined quantity of beverage suitable for consumption using an extractable product, comprising:

providing an exchangeable capsule, comprising a circumferential wall, a bottom, and a lid enclosing an inner space comprising the extractable product, providing an apparatus comprising a receptacle for holding the exchangeable capsule, a fluid dispensing device for supplying an amount of a fluid, such as water, under pressure to the exchangeable capsule for preparing the beverage, and an outlet which, in use, is in fluid communication with the capsule for draining the prepared beverage from the capsule and supplying the beverage to a container such as a cup, supplying the fluid to the extractable product for preparing the beverage, wherein the lid of the capsule is a sheet-shaped multi-layer filter comprising at least a first layer and a second layer bonded together, wherein the first layer has a higher tear strength than the second layer and wherein the second layer has a higher stiffness than the first layer.

* * * * *